United States Patent
Mairs

(10) Patent No.: US 9,160,856 B2
(45) Date of Patent: Oct. 13, 2015

(54) PROCESSING TELEPHONE CALLS

(71) Applicant: Metaswitch Networks Ltd., Enfield (GB)

(72) Inventor: Chris Mairs, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 13/849,069

(22) Filed: Mar. 22, 2013

(65) Prior Publication Data

US 2013/0216039 A1 Aug. 22, 2013

Related U.S. Application Data

(63) Continuation of application No. PCT/GB2011/001382, filed on Sep. 22, 2011.

(30) Foreign Application Priority Data

Sep. 22, 2010 (GB) .................................. 1015954.9

(51) Int. Cl.
*H04M 3/00* (2006.01)
*H04M 3/523* (2006.01)
*H04M 3/424* (2006.01)
*H04W 4/16* (2009.01)
*H04L 29/08* (2006.01)

(52) U.S. Cl.
CPC ............. *H04M 3/5231* (2013.01); *H04L 67/24* (2013.01); *H04M 3/424* (2013.01); *H04M 3/523* (2013.01); *H04W 4/16* (2013.01)

(58) Field of Classification Search
USPC ........ 379/265.01–265.14, 266.01–266.1, 309
See application file for complete search history.

(56) References Cited

U.S. PATENT DOCUMENTS

| | | | |
|---|---|---|---|
| 6,081,725 A * | 6/2000 | Ishida ............................ | 455/462 |
| 6,411,805 B1 * | 6/2002 | Becker et al. ............... | 455/414.1 |
| 6,850,615 B1 | 2/2005 | Patel et al. | |
| 6,970,547 B2 * | 11/2005 | Andrews et al. ......... | 379/210.01 |
| 6,975,720 B1 | 12/2005 | Crook | |
| 7,076,043 B2 * | 7/2006 | Curbow et al. .......... | 379/201.06 |
| 8,762,858 B1 * | 6/2014 | Tovino et al. ................. | 715/751 |
| 2003/0035531 A1* | 2/2003 | Brown et al. ............ | 379/265.01 |

(Continued)

FOREIGN PATENT DOCUMENTS

| | | | |
|---|---|---|---|
| EP | 0539105 A2 | 4/1993 | |
| EP | 1480487 A1 | 11/2004 | |
| EP | 2031850 A2 | 3/2009 | |
| GB | 2318950 A | 5/1998 | |

(Continued)

*Primary Examiner* — William Deane, Jr.
(74) *Attorney, Agent, or Firm* — EIP US LLP

(57) ABSTRACT

Methods, apparatus and computer program products for indicating availability in a telecommunications network are provided. An availability alerting service is initiated in response to a trigger associated with non-completion of an initial call from a calling party to a called party, the availability alerting service provides the calling party with availability alert information to solicit a follow-up call from the calling party when the called party has a given availability state after the initial call. The availability alerting service detects a first availability status change after initiation of the alerting service, and transmits a first availability update message to the calling party to solicit the follow-up call. A second availability status change is detected, subsequent to the first availability status change, and a second availability update message is transmitted to the calling party to inhibit the follow-up call.

12 Claims, 10 Drawing Sheets

(56) References Cited

U.S. PATENT DOCUMENTS

| | | | |
|---|---|---|---|
| 2005/0008008 A1* | 1/2005 | Ohura | 370/352 |
| 2005/0043022 A1 | 2/2005 | Okon et al. | |
| 2006/0093116 A1* | 5/2006 | Baird | 379/209.01 |
| 2009/0299941 A1* | 12/2009 | McColgan et al. | 706/47 |

FOREIGN PATENT DOCUMENTS

| | | |
|---|---|---|
| GB | 2403621 A | 1/2005 |
| GB | 2414632 A | 11/2005 |
| JP | 2003143301 A1 | 5/2003 |
| WO | 2007035222 A1 | 3/2007 |

\* cited by examiner

PROCESSING TELEPHONE CALLS

CROSS REFERENCE TO RELATED APPLICATIONS

This application is a Continuation of international patent application no. PCT/GB2011/001382, filed on Sep. 22, 2011, which claims priority to foreign patent application no. GB 1015954.9, filed on Sep. 22, 2010, the disclosures of which are incorporated herein by reference in their entireties.

TECHNICAL FIELD

The present disclosure relates to the processing of telephone calls. In particular, but not exclusively, the present disclosure relates to the processing of telephone calls in order to provide availability alerting services.

BACKGROUND

Communication between a calling party and a recipient in a telecommunications network is typically initiated by the calling party attempting to conduct a telephone call with the recipient by dialling the recipient's telephone dialling number on a calling party telephony device. In order for the call to proceed, the recipient must accept the call. If the recipient is busy or does not wish to take the call for some reason, then the calling party's attempt to conduct a telephone call with the recipient will fail.

When a calling party attempts to call a recipient, the calling party typically has no knowledge as to whether the recipient will be available to accept a call. Therefore, in order to successfully speak to a currently unavailable recipient, the calling party may have to initiate one or more a subsequent call attempts, in the hope that the recipient later becomes available for a call.

The above problem is regularly encountered when a calling party attempts to contact a call centre. A call centre is a point of contact, typically between businesses and their customers, that handles a large volume of incoming telephone calls, often from customers requiring information or some form of product support. If no call centre operators are available to take the call, the call will typically be placed in a queue to be distributed to an operator when one becomes available, typically in a 'First-in, First-Out' manner.

During a busy period for the call centre, there may not be enough operators to keep the queuing time down to an acceptable level. As a result, a calling party may have to wait for an unacceptably long period of time to speak to an operator, resulting in an unpleasant experience for the calling party. In order to avoid waiting in the queue, the calling party may terminate the call and initiate a second call with the call centre at a later time. However, there may be a similarly large or increased number of calls in the queue at the time that the second call is initiated, resulting in no decrease in the amount of waiting time.

A known system describes a method for providing a call back option to a customer of a call centre in response to a first call from the customer. The call back option may consist of a call centre operator placing a return call to the customer when the call centre is less busy, or arranging a time for the customer to call back when the call centre is expected to be less busy. The call centre operator may attempt a return call at a time that turns out to be inconvenient for the customer. Further, the call centre may arrange for the customer to call back at a time when the customer is not available to call back.

A known system describes a method for processing an inbound call to a call centre during a busy period at the call centre in which the caller is assigned a place in a queue and a time window in which they are advised to call back. The call centre will keep the caller's place in the queue after the first call is disconnected if the caller calls back within the time window assigned to them.

It would be desirable to provide improved methods for a calling party to contact a recipient, in the case of non-completion of an initial call.

SUMMARY

In accordance with first embodiments, there is a method of indicating availability in a telecommunications network, the method comprising:
  initiating an operator availability alerting service in response to a trigger associated with non-completion of an initial call from a calling party, the initial call being directed to a call handling system comprising a call queuing system for allocating a call to one of a plurality of operators after reaching the front of a call holding queue, the trigger relating to the initial call not being allocated to an operator in the plurality of operators, the operator availability alerting service providing the calling party with availability alert information to solicit a follow-up call from the calling party when the call handling system has a given availability state after the initial call,
  wherein the availability alerting service is responsive to a plurality of different availability states relating to the call handling system, and
  wherein the availability alerting service detects a first availability status change relating to the call handling system after initiation of the availability alerting service and transmits a first availability update message to the calling party to solicit the follow-up call on the basis of the detected first availability status change, and detects a second availability status change, subsequent to the first availability status change, and transmits a second availability update message to the calling party to at least inhibit the follow-up call on the basis of the detected second availability status change.

In accordance with second embodiments, there is apparatus arranged to indicate availability in a telecommunications network, the apparatus comprising:
  an initiator component configured to initiate an operator availability alerting service in response to a trigger associated with non-completion of an initial call from a calling party, the initial call being directed to a call handling system comprising a call queuing system for allocating a call to one of a plurality of operators after reaching the front of a call holding queue, the trigger relating to the initial call not being allocated to an operator in the plurality of operators, the operator availability alerting service providing the calling party with availability alert information to solicit a follow-up call from the calling party when the call handling system has a given availability state after the initial call,
  wherein the availability alerting service is responsive to a plurality of different availability states relating to the call handling system, and
  wherein the availability alerting service detects a first availability status change relating to the call handling system after initiation of the availability alerting service and transmits a first availability update message to the calling party to solicit the follow-up call on the basis of the detected first availability status change, and detects a second availability status change, subsequent to the first availability status change, and transmits a second availability update message to the calling party to at least inhibit the follow-up call on the basis of the detected first availability status change.

In accordance with third embodiments, there is computer program product comprising a non-transitory computer-readable storage medium having computer readable instructions stored thereon, the computer readable instructions being executable by a computerized device to cause the computerized device to perform a method for indicating availability in a telecommunications network, the method comprising:

initiating an operator availability alerting service in response to a trigger associated with non-completion of an initial call from a calling party, the initial call being directed to a call handling system comprising a call queuing system for allocating a call to one of a plurality of operators after reaching the front of a call holding queue, the trigger relating to the initial call not being allocated to an operator in the plurality of operators, the operator availability alerting service providing the calling party with availability alert information to solicit a follow-up call from the calling party when the call handling system has a given availability state after the initial call, wherein the availability alerting service is responsive to a plurality of different availability states relating to the call handling system, and wherein the availability alerting service detects a first availability status change relating to the call handling system after initiation of the availability alerting service and transmits a first availability update message to the calling party to solicit the follow-up call on the basis of the detected first availability status change, and detects a second availability status change, subsequent to the first availability status change, and transmits a second availability update message to the calling party to at least inhibit the follow-up call on the basis of the detected second availability status change.

Further features and advantages will become apparent from the following description of preferred embodiments, given by way of example only, which is made with reference to the accompanying drawings.

DETAILED DESCRIPTION

Figure 1:
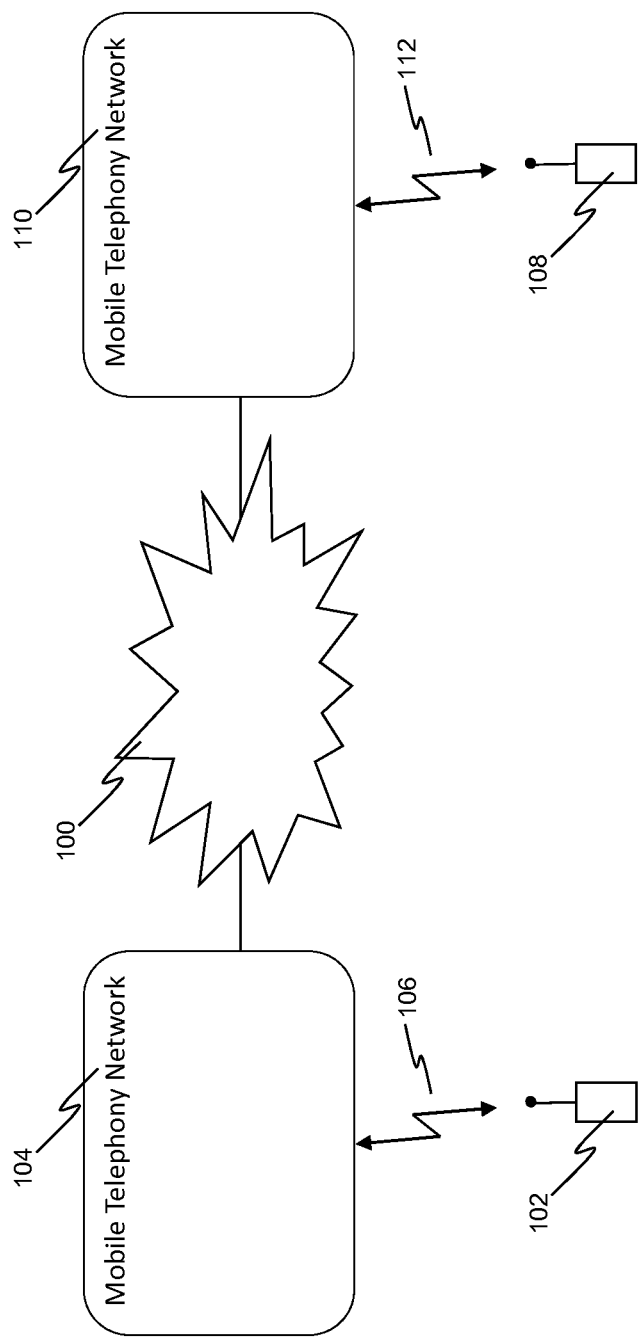
FIG. 1 is a system diagram according to embodiments.

FIG. 1 is a system diagram according to embodiments. A calling party having a telephony device 102 can place a call to a recipient having a recipient telephony device 108 via telecommunications network 100. Telecommunications network 100 may include one or more circuit-switched and/or packet-switched networks such as a Public Switched Telephone Network (PSTN) and the Internet respectively.

In the embodiments of FIG. 1, calling party device 102 is a mobile telephony device, such as a cellular telephone handset, which accesses a mobile telephony network 104 via a radio interface 106. Mobile telephony network 104 includes a mobile switching centre, one or more base station controllers, and one or more base transceiver stations; the function of such mobile telephony network entities is well known in the art and will not be described in detail here. Mobile telephony network 104 also provides telephony services to a number of other mobile telephony devices (not shown).

In the embodiments of FIG. 1, recipient telephony device 108 is also a mobile telephony device, which accesses a mobile telephony network 110 via a radio interface 112. Mobile telephony network 104 is connected to mobile telephony network 110 via telecommunications network 100.

The interfaces between telecommunications network 100, and mobile telephony networks 104 and 110 may include one or more gateway or session border controller entities (not shown) which carry out conversion between the various protocols and data formats used to transfer media data and signalling data in the different networks.

Calling party device 102 is adapted to receive data via mobile telephony network 104, for example using an appropriate protocol from the Internet Protocol Suite via one or more packet-switched parts of telecommunications network 100.

Recipient device 108 is adapted to receive and process incoming call requests relating to availability alerting services using a software application, or in-built function, providing an availability alerting service on recipient device 108. Recipient device 108 includes a memory store (not shown) for storing data relating to the operation of the availability alerting service application. Recipient device 108 is adapted to receive data via mobile telephony network 110, for example using an appropriate protocol from the Internet Protocol Suite and one or more packet-switched parts of telecommunications network 100.

Figure 2:
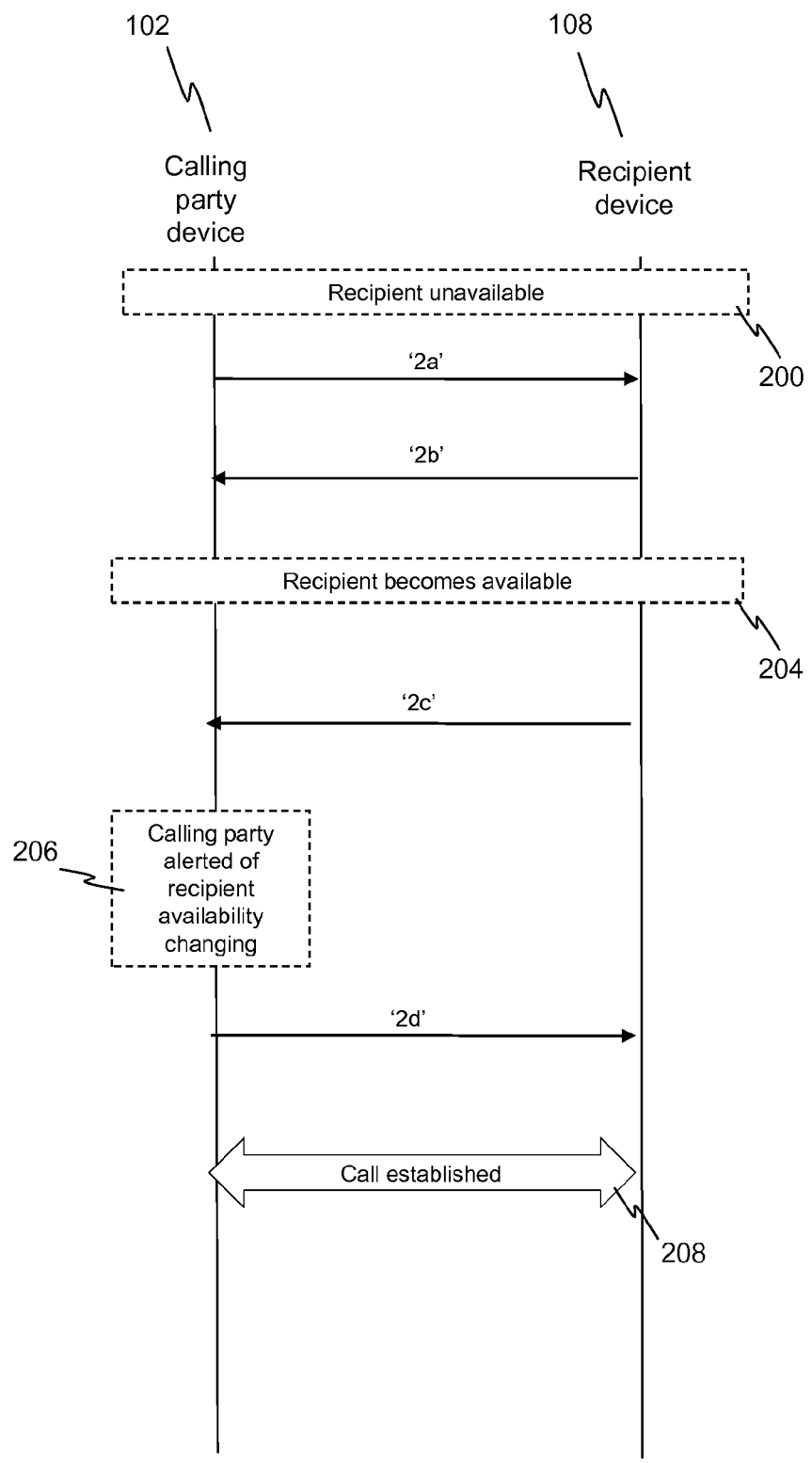
FIG. 2 is a message flow diagram according to embodiments.

FIG. 2 is a message flow diagram showing operation of availability alerting services according to embodiments, for example implemented in a system depicted in FIG. 1.

In these embodiments, an availability alerting service is initiated in response to a trigger associated with non-completion of an initial call from a calling party to a called party. The availability alerting service provides the calling party with availability alert information to solicit a follow-up call from the calling party when the called party has a given availability state after the initial call, and the availability alerting service is responsive to a plurality of different availability states relating to the called party.

At the start of the message flow, a recipient (or set of recipients) is unavailable to accept an incoming call from calling party device 102, as shown by item 200. The calling party initiates a first call to recipient device 108 from calling device 102 which results in a first call set-up procedure being conducted between calling party device 102 and recipient device via mobile telephony network 104, telecommunications network 100 and mobile telephony network 110. An incoming call request from the calling party is received at recipient device 108 in step 2a.

Initiation of the availability alerting service may involve checking the current availability of the recipient, for example with reference to appropriate availability data stored in the recipient device memory store, or by detecting that the recipient device is in an engaged call state.

The availability alerting service may be initiated by in response to non-completion of the call by detecting an identifier of calling device 102 associated with the calling party, and transmitting a service initiation notification to the calling party using the calling party device identifier in step 2b. The service initiation notification informs the calling party that their initial incoming call request to the recipient has been unsuccessful, but that an availability alerting service has been initiated which will inform the calling party when the recipient becomes available; the calling party is thus discouraged from attempting to initiate further calls to the recipient for the time being.

When the recipient becomes available to conduct a call with the calling party, as shown by item 204, the availability alerting service on recipient device 108 transmits an availability update message from recipient device 108 to calling party device 102 in step 2c in order to solicit a follow-up incoming call request from the calling party.

When the availability update message of step 2c is received at calling party device 102, the calling party is alerted to the fact that the recipient is available to accept an incoming call, as shown by item 206. As a result, the calling party can initiate a second call to recipient device 108 at a subsequent time that is convenient for the calling party, which results in a second call set-up procedure being conducted between calling party device 102 and recipient device 108. A follow-up incoming call request from the calling party is received at recipient device 108 in step 2d. The recipient accepts the follow-up incoming call request of step 2d and a call is established between calling party device 102 and recipient device 108, as shown by item 208.

Once a call between the calling party and recipient has successfully been established, the availability alerting service can be deactivated. The deactivation may include removal of data associated with calling party device 102 from the memory store of recipient device 108.

The service initiation notification may include a push notification transmitted to a software application, or in-built function, providing an availability alerting service on calling party device 102. The push notification involves use of push technology to forward information relating to the availability alerting service. In the case of calling party device 102 being an Apple® iPhone®, the push notification could employ use of the Apple® Push Notification Service (APNS). The push notification could include an identifier for calling party device 102 and also an identifier for the software application, or in-built function, providing an availability alerting service, such that the push notification service can direct the appropriate data directly to the correct application on the correct device. The push notification may also include an identifier or other data specific to the recipient party for which the service is being provided; for example facilitating display of an icon specific to the recipient party on the calling party device such as a "Call Centre" icon which includes the identity of the call centre.

The detected identifier of calling device 102 may be stored in the memory store of recipient device 108. The identifier of calling party device 102 can be used to route data such as the service initiation notification and/or availability update message to calling party device 102 via mobile telephony network 110, telecommunications network 110 and mobile telephony network 104. The calling party device identifier may be a logical address associated with the calling party device such as a Mobile Station International Subscriber Directory Number (MSISDN) or Internet Protocol (IP) address.

The availability update message of step 2c may be transmitted in response to a change in the availability status of the recipient, for example the recipient availability status changes from unavailable to available to accept an incoming call from the calling party, as shown by item 204. The calling party is thus encouraged to attempt to initiate a follow-up call to the recipient at a time that is convenient for both the calling party and the recipient. In addition, an availability update message may be transmitted in response to one or more further changes in the availability status of the recipient, for example the recipient availability status changes from available to unavailable. The calling party is thus discouraged to attempt to initiate a follow-up call to the recipient at a time that is inconvenient for the recipient, or if the recipient device is engaged in a call. When the recipient availability status changes again from unavailable to available, a further availability update message may be transmitted to provide a suitable indication on the calling party device to encourage the follow-up call.

The availability alerting service thus detects a first availability status change relating to the called party after initiation of the availability alerting service and transmits a first availability update message to the calling party to solicit the follow-up call on the basis of the detected first availability status change, and detects a second availability status change, subsequent to the first availability status change, and transmits a second availability update message to the calling party to at least inhibit the follow-up call on the basis of the detected second availability status change.

The recipient may change their availability status by appropriate input on recipient device 108. The input from the recipient causes the availability alerting service on recipient device 108 to update appropriate data in the recipient device memory store. Alternatively, the availability status may change in accordance with one or more recipient availability status rules, or be dependent on the time of day, day of week, etc. The recipient may configure availability status rules via the availability alerting service on recipient device 108. A recipient may generate customised availability status rules for different calling parties, groups of calling parties, calls from different regions or countries etc.

In embodiments, a call is established in response to the first incoming call request, and a voice message is transmitted to the calling party to indicate a current unavailability status of the recipient. Transmittal of the voice message may involve use of an Interactive Voice Response (IVR) system (not shown) located within telecommunications network 100, the operation of which is known to one skilled in the art. The voice message informs the calling party that the recipient is currently unavailable but gives the calling party the option of having an availability alerting service initiated for the recipient. The calling party can choose to initiate an availability alerting service by reacting to the voice message with a suitable voice or keypad input via calling party device 102. The input from the calling party causes an indicator to be transmitted to recipient device 108 during the call that indicates that the calling party requests initiation of the availability alerting service; an availability alerting service is initiated upon receipt of the indicator at recipient device 108.

In alternative embodiments, instead of establishing a call in response to the first incoming call request, and transmitting a voice message to the calling party to indicate a current unavailability status of the recipient, a recipient unavailability message, for example a Short Message Service (SMS) message can be transmitted to the calling party. The calling party can then respond to the recipient unavailability message with a message indicating that availability alerting services should be initiated, for example with a further SMS message.

In embodiments, the availability update message is transmitted in response to an update request from software application, or in-built function, providing an availability alerting service running on a device associated with the calling party, for example calling party device 102. The software application providing an availability alerting service running on calling party device 102 may be transmitted to calling party device 102 from recipient device 108 during initiation of the availability alerting service.

Embodiments relating to the provision of priority handling services to a calling party attempting to call a recipient or set of recipients may also be implemented in the system depicted in FIG. 1 via a similar message flow to that depicted in FIG. 2.

Recipient device 108 is adapted to receive and process incoming call requests relating to priority handling services using application software, or an in-built function, providing a priority handling service on recipient device 108. Recipient device 108 includes a memory store (not shown) for storing data relating to the operation of the priority handling service application.

When the calling party initiates a first call to recipient device 108, a first call set-up procedure is conducted resulting in an incoming call request from the calling party being received at recipient device 108 in step 2a. The status of the recipient (or set of recipients) is detected, for example by reference to recipient availability status data stored in the recipient device memory store, as being unavailable. In response to detection of the unavailability state, an option for the calling party to attempt a follow-up call instead of progressing the detected unavailable state is determined, for example by providing a stored voice message and receiving confirmation from the calling party, for example by Dual Tone Multiple Frequency (DTMF) input. A priority handling service is initiated for the calling party in response to the determined option.

When the calling party initiates a second call to recipient device 108, a second call set-up procedure is conducted resulting in a follow-up incoming call request being received from the calling party. As a result of a priority handling service being initiated for the calling party, the second call set-up procedure is handled using the priority handling service.

Initiation of the priority handling service may involve detecting an identifier of a device, such as calling party device 102, associated with the calling party in the first call set-up procedure and storing the detected calling party device identifier, for example in the recipient device memory store. A calling party device identifier received during the second call set-up procedure, is then matched with the stored calling party device identifier allowing correct identification of the second call from the calling party to apply a priority handling service to.

Alternatively, when a priority handling service is initiated for a calling party, a priority handling service access code can be issued and transmitted back to the calling party. When the calling party makes a follow-up call to the recipient, the priority handling service access code can be included in the follow-up call set-up request so that the calling party can be correctly identified as a calling party to which a priority handling service should be provided. The access code can be made specific to a particular calling party to prevent unauthorised use by other calling parties. The access code can be time-stamped to prevent use of the access code after a certain amount of time has elapsed since its issuance.

A calling party that has been waiting for a long period of time to speak to the recipient may become frustrated, resulting in an unpleasant experience for the calling party. Therefore, priority handling of the second call set-up procedure for a calling party can be conducted if at least a predetermined length of time has passed since initiation of the priority handling service for the calling party. The predetermined length of time may be stored in the memory component of the recipient device, and may represent a typical or otherwise acceptable wait duration. The predetermined length of time could be user-configurable.

Embodiments involve combining availability alerting services with priority handling services such that when priority handling services are initiated, availability alerting services are also initiated. Provision of priority handling services can also involve transmitting an availability update message to solicit a follow-up incoming call request from the calling party.

Figure 3:
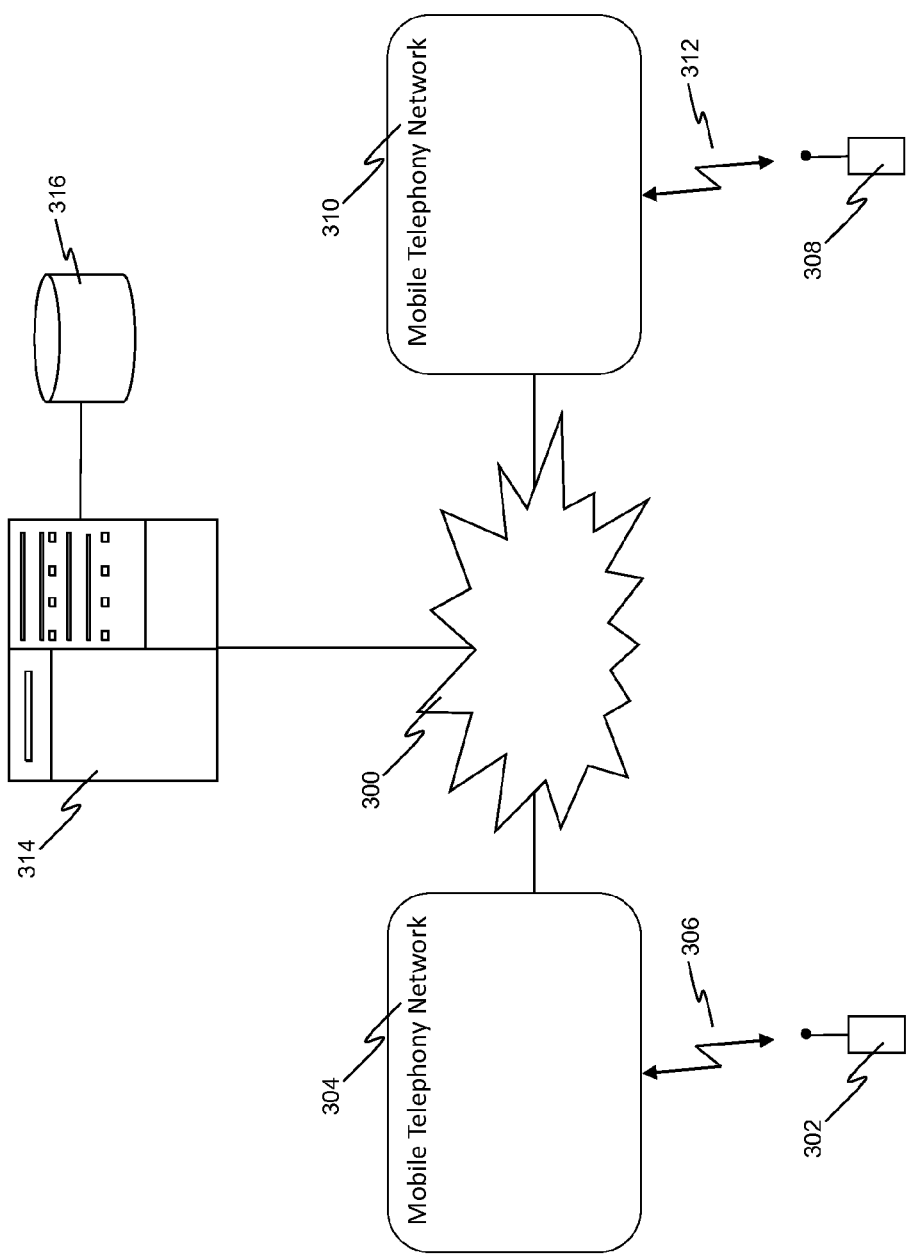
FIG. 3 is a system diagram according to embodiments.

FIG. 3 is a system diagram according to embodiments. Telecommunications network 300, calling party device 302, recipient device 308, mobile networks 304 and 310, and radio interfaces 306 and 312 perform similar functions to the corresponding entities in FIG. 1. However, instead of availability alerting services for recipient device 308 being provided by a software application running on recipient device 108, or an in-built function on recipient device 108, availability alerting services for recipient device 308 are provided by an entity separate to recipient device 308, such as server 314 connected to telecommunications network 300. Server 314 may also be responsible for providing availability alerting services for additional recipient parties having additional recipient devices (not shown).

According to embodiments, telecommunications network 300 and mobile telephony network 310 are configured to forward incoming calls directed to recipient device 308 associated with the recipient to server 314. This can be achieved using mechanisms known in the art, for example call forwarding techniques.

Server 314 includes a data store 316 for storing data relating to the operation of availability alerting services, including data associated with the availability status of the recipient. Server 314 may include or have access to an IVR system (not shown) responsible for playing information messages to calling parties, and receiving data input from calling parties.

Server 314 is configured to communicate with an availability status application running on recipient device 308 via telecommunications network 300 and mobile telephony network 310 in order to determine the availability status of the recipient. Data associated with the availability status of the recipient may be periodically transmitted to server 314 from the availability status application running on recipient device 308. Alternatively, recipient availability status data may be pushed to server 314 from the availability status application running on recipient device 308 in response to a change in the availability of the recipient. As a further alternative, server 314 may periodically poll the availability status application running on recipient device 308 to obtain data on recipient availability status. Recipient availability status data may be transmitted from recipient device 308 to server 314 over mobile network 310 in the form of packet data using a transport protocol such as the High Speed Packet Access (HSPA) protocol, and an appropriate protocol from the Internet Protocol Suite over one or more packet-switched parts of telecommunications network 300.

The recipient may change their availability status by appropriate input to the availability status application running on recipient device 108, or directly via a web-based interface to server 314. Alternatively, the recipient may input recipient availability data at a further recipient device (not shown) such as a personal computer, which is transmitted to server 314 using an appropriate transport protocol over one or more packet-switched parts of telecommunications network 300. For example, the recipient may enter data to set their availability status to unavailable if they are about to enter a meeting.

Alternatively or additionally, an availability status service provided on server 314 or recipient device 308 may monitor an electronic calendar associated with the recipient to automatically update the availability status of the recipient when the recipient is scheduled to be unavailable.

Figure 4:
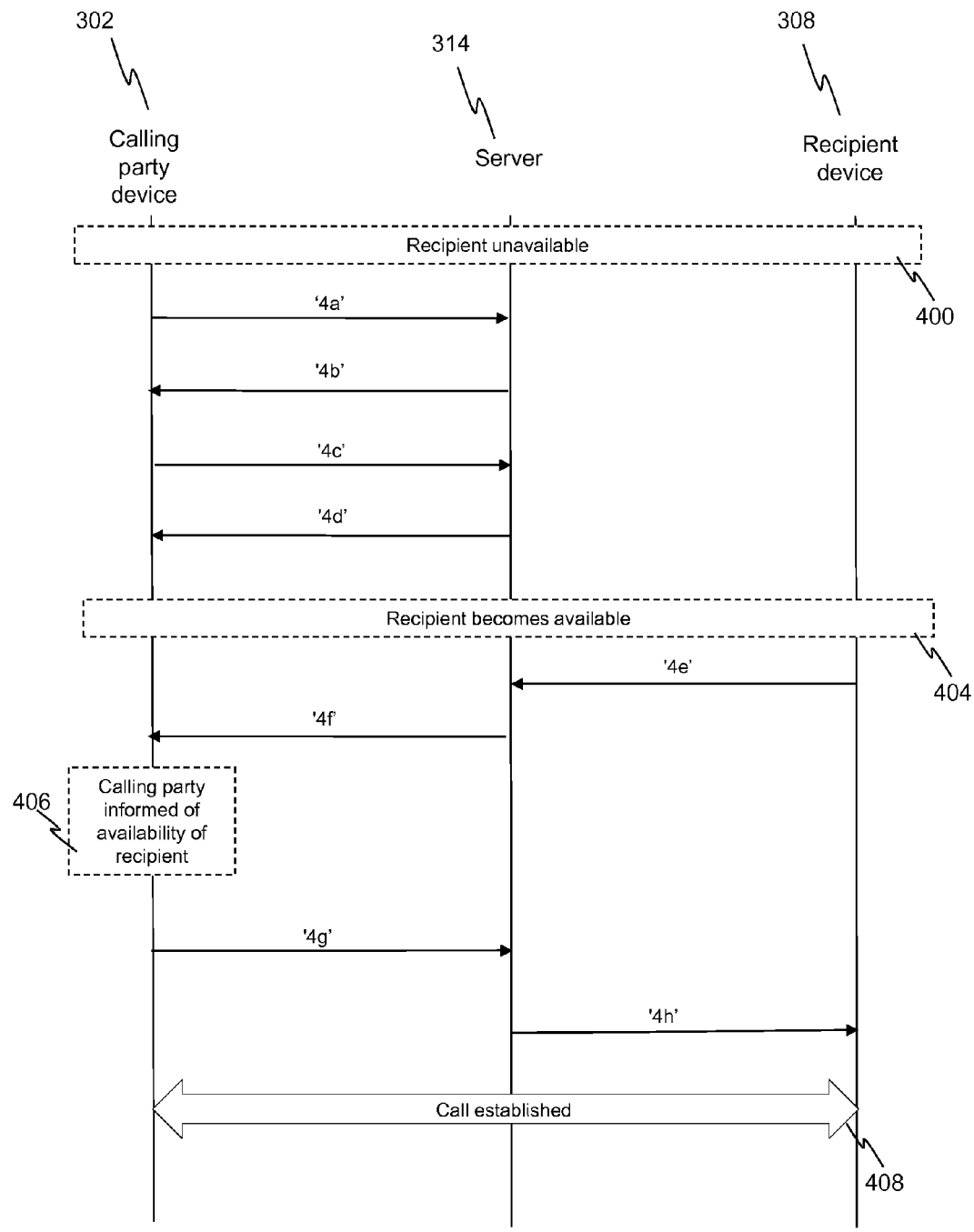
FIG. 4 is a message flow diagram according to embodiments.

FIG. 4 is a message flow diagram showing operation of availability alerting services according to embodiments, for example implemented in a system depicted in FIG. 3.

At the start of the message flow, the recipient is unavailable to accept an incoming call from calling party device 302, as shown by item 400. The calling party initiates a first call to recipient device 308 from calling device 302 which results in a first call set-up procedure. The first call set-up procedure causes the call to be forwarded to server 314 such that an incoming call request from the calling party is received at server 314 in step 4a.

Server 314 determines the availability status of the recipient from data store 316. If server 314 determines that the recipient is available to take the call from the calling party, then the call is forwarded on to recipient device 308 and no availability alerting service is initiated.

If server 314 determines that the recipient is unavailable to take the call from the calling party, then server 314 responds to the first incoming call request by establishing a call, and transmitting a voice message to the calling party in step 4b to indicate a current unavailability status of the recipient. Transmittal of the voice message may involve use of an Interactive Voice Response (IVR) system located within server 314 or accessible by server 314 within network 300 (not shown). The voice message may for example state "If you would like to initiate an availability alerting service for the person you are trying to call, please press one on your keypad now."

The calling party can choose to initiate an availability alerting service by responding to the voice message with a suitable voice or keypad input via calling party device 302. The input from the calling party causes an indicator to be transmitted to server 314 during the call in step 4c that indicates that the calling party requests initiation of the availability alerting service; an availability alerting service is initiated by server 314 upon receipt of the indicator.

Server 314 informs the calling party that an availability alerting service has been initiated by transmitting a service initiation notification to the calling party in step 4d. Initiation of the availability alerting service may include detection of an identifier of a calling device associated with the calling party and inclusion of the identifier in the service initiation notification.

When the recipient becomes available to conduct a call with the calling party, as shown by item 404, server 314 is informed of such by transmittal of data associated with the updated availability status of the recipient to server 314 in step 4e. Server 314 then transmits an availability update message to calling party device 302 in step 4f in order to solicit a follow-up incoming call request from the calling party.

When the availability update message of step 4f is received at calling party device 302, the calling party is alerted to the fact that the recipient is available to accept an incoming call, as shown by item 406. As a result, the calling party can initiate a second call to recipient device 308 at a subsequent time that is convenient for both the calling party and the recipient, which results in a second call set-up procedure being conducted between calling party device 302 and recipient device 308. A follow-up incoming call request from the calling party is received at server 314 in step 4g. Server 314 forwards the follow-up incoming call request to recipient device 1308 in step 4h. The recipient accepts the follow-up incoming call request of step 4h and a call is established between calling party device 302 and recipient device 308, as shown by item 408.

Once a call between the calling party and recipient has successfully been established, the availability alerting service is deactivated. The deactivation may include removing any data associated with calling party device 302 from memory store 316 of server 314.

Embodiments relating to the provision of priority handling services to a calling party attempting to call a recipient or set of recipients may also be implemented in the system depicted in FIG. 3 via a similar message flow to that depicted in FIG. 4.

Server 314 is adapted to receive and process incoming call requests relating to priority handling and provide priority handling services. Memory store 316 of server 314 is adapted to storing data relating to the operation of the priority handling services.

Figure 5:
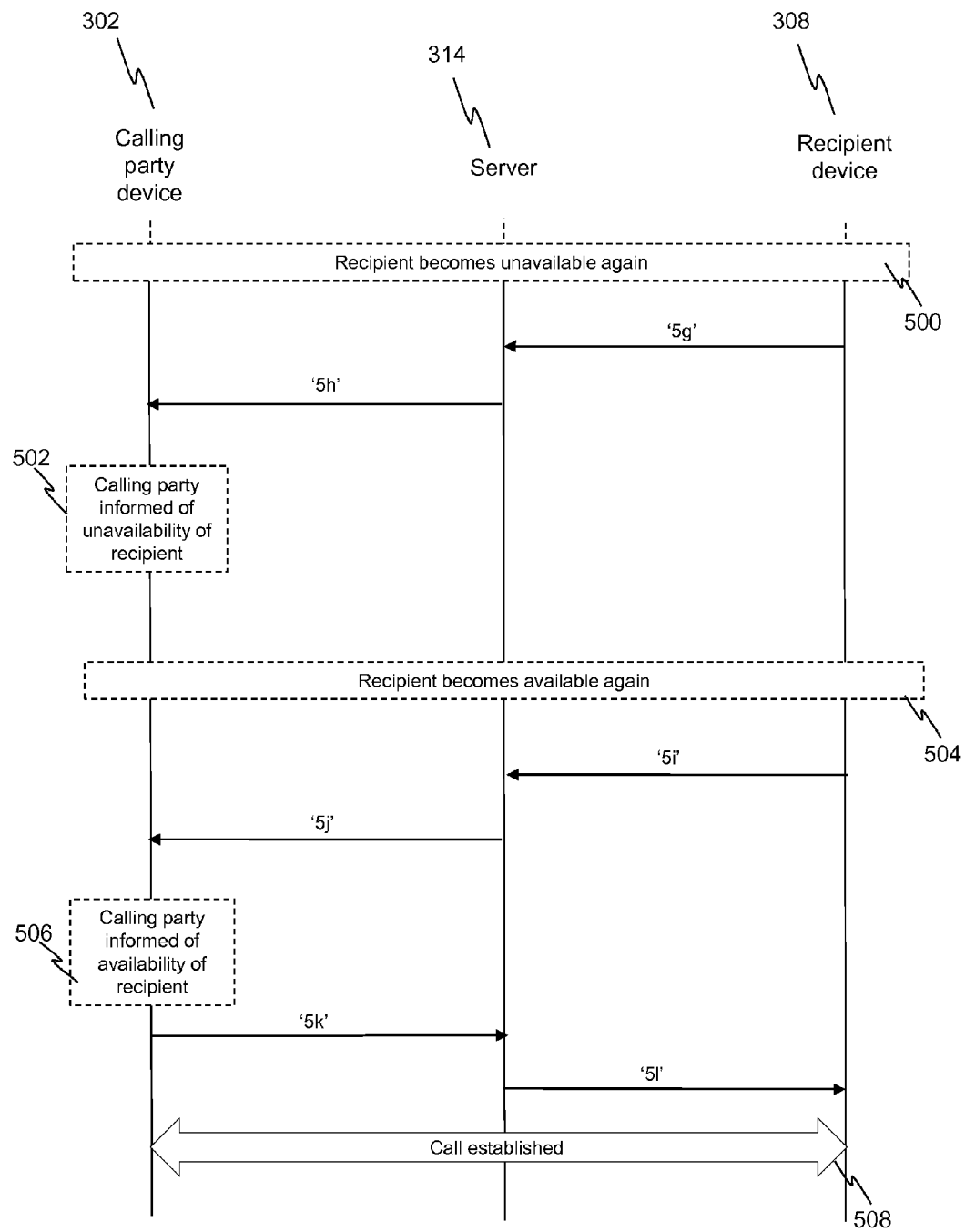
FIG. 5 is a message flow diagram according to embodiments.

FIG. 5 is a message flow diagram showing operation of availability alerting services according to embodiments, for example implemented in a system depicted in FIG. 3. The steps shown in the message flow of FIG. 5 are preceded by steps 4a to 4f of FIG. 4 described above.

FIG. 5 depicts a situation where availability alerting services are initiated for the calling party with respect to a recipient and the calling party receives an availability update message indicating that the recipient is available for a call with the calling party. However, the calling party misses the opportunity to make a follow-up call to the recipient and the status of the recipient changes back to being unavailable for a call with the calling party, as shown by item 500.

The availability status service on recipient device 308 informs server 314 of the updated availability status of the recipient in step 5g.

Server 314 then transmits a further availability update message to the calling party device 302 in step 5h. The further availability update message informs the calling party that the recipient is once again unavailable for a call with the calling party, as shown by item 502. The calling party is thus discouraged once more from attempting to initiate further calls to the recipient for the time being.

Subsequently, the availability status of the recipient returns to being available for a call with the calling party once more, as shown by item 504.

The availability alerting service on recipient device 308 informs server 314 of the updated availability status of the recipient in step 5i. Server 314 then transmits a further availability update message to the calling party device 302 in step 5j. The further availability update message informs the calling party that the recipient is once again available for a call with the calling party, as shown by item 506. The calling party is therefore once again encouraged to attempt to initiate a call with the recipient.

When the calling party initiates a second call to recipient device 308 at a subsequent time that is convenient for both the calling party and the recipient, this results in a second call set-up procedure being conducted between calling party device 302 and recipient device 308. A follow-up incoming call request from the calling party is received at server 314 in step 5k. Server 314 forwards the follow-up incoming call request to recipient device 308 in step 5*l*. The recipient accepts the follow-up incoming call request of step 5*l* and a call is established between calling party device 302 and recipient device 308, as shown by item 508.

Figure 6:
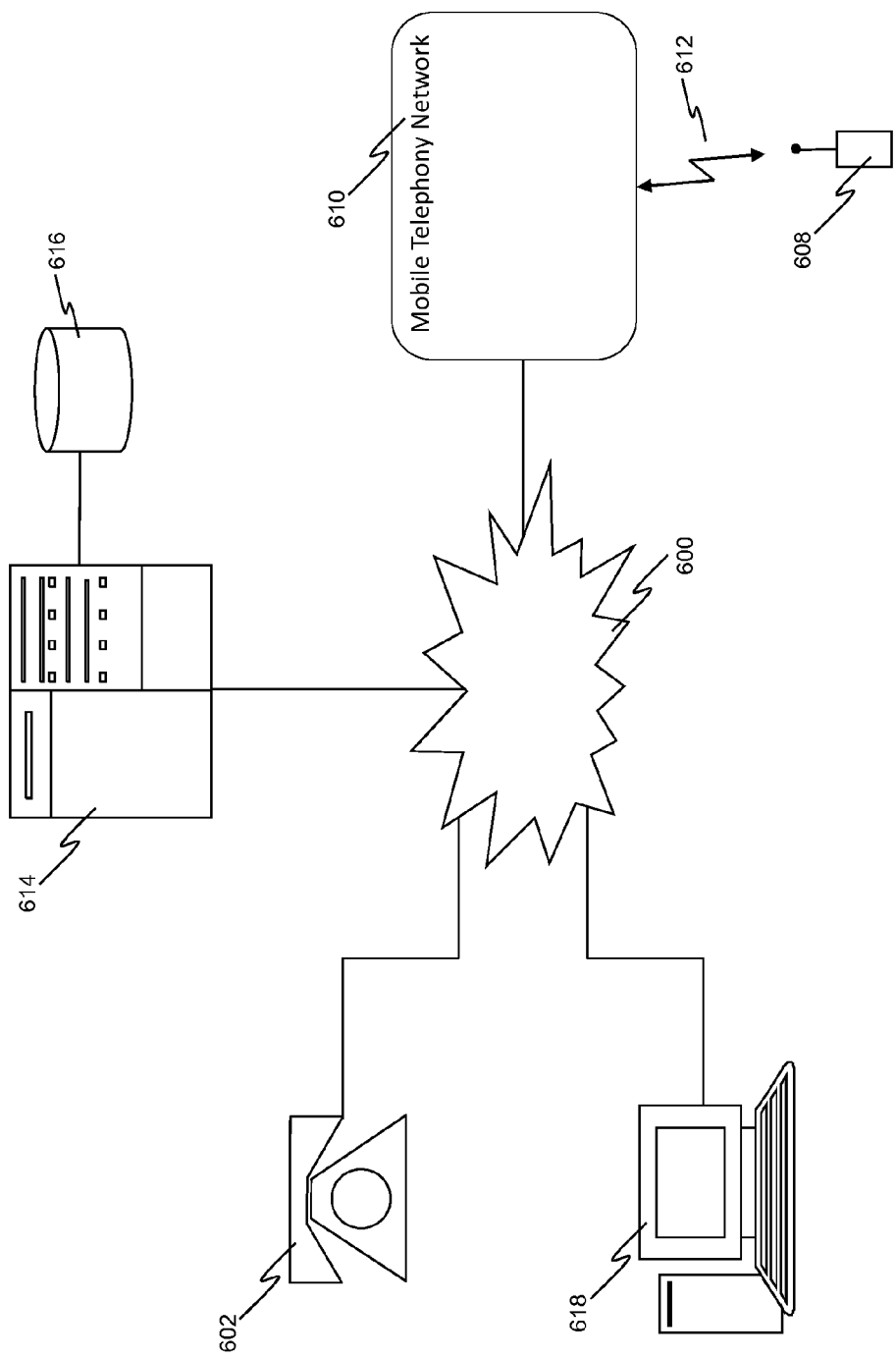
FIG. 6 is a system diagram according to embodiments.

FIG. 6 is a system diagram according to embodiments. In these embodiments, a calling party attempts to call the recipient from a calling party device 602 with insufficient data processing capabilities for running software application providing an availability alerting service software or for handling availability alerting service alert messages or notifications. Calling party device 602 may for example be an analogue telephone (or 'black phone'). In such embodiments, software application providing an availability alerting service software is instead installed on a second calling party device 618, such as a personal computer, which does have sufficient data processing capabilities. Second calling party device 618 will typically not have telephone call functionality.

In the embodiments of FIG. 6, telecommunications network 600, recipient device 608, mobile telephony network 610, radio interface 612, server 614 and data store 616 perform similar functions as the corresponding entities described above with reference to FIG. 3.

First calling party device 602 interfaces with one or more circuit switched parts of telecommunications network 600, such as the PSTN. Second calling party device 618, interfaces with one or more packet switched parts of telecommunications network 600, such as the Internet.

The interfaces between mobile telephony network 610, circuit switched parts of telecommunications network 600 and packet switched parts of telecommunications network 600, may include one or more gateway or session border controller entities (not shown) which carry out conversion between the various protocols and data formats used to transfer media data and signalling data in the different networks.

Figure 7:
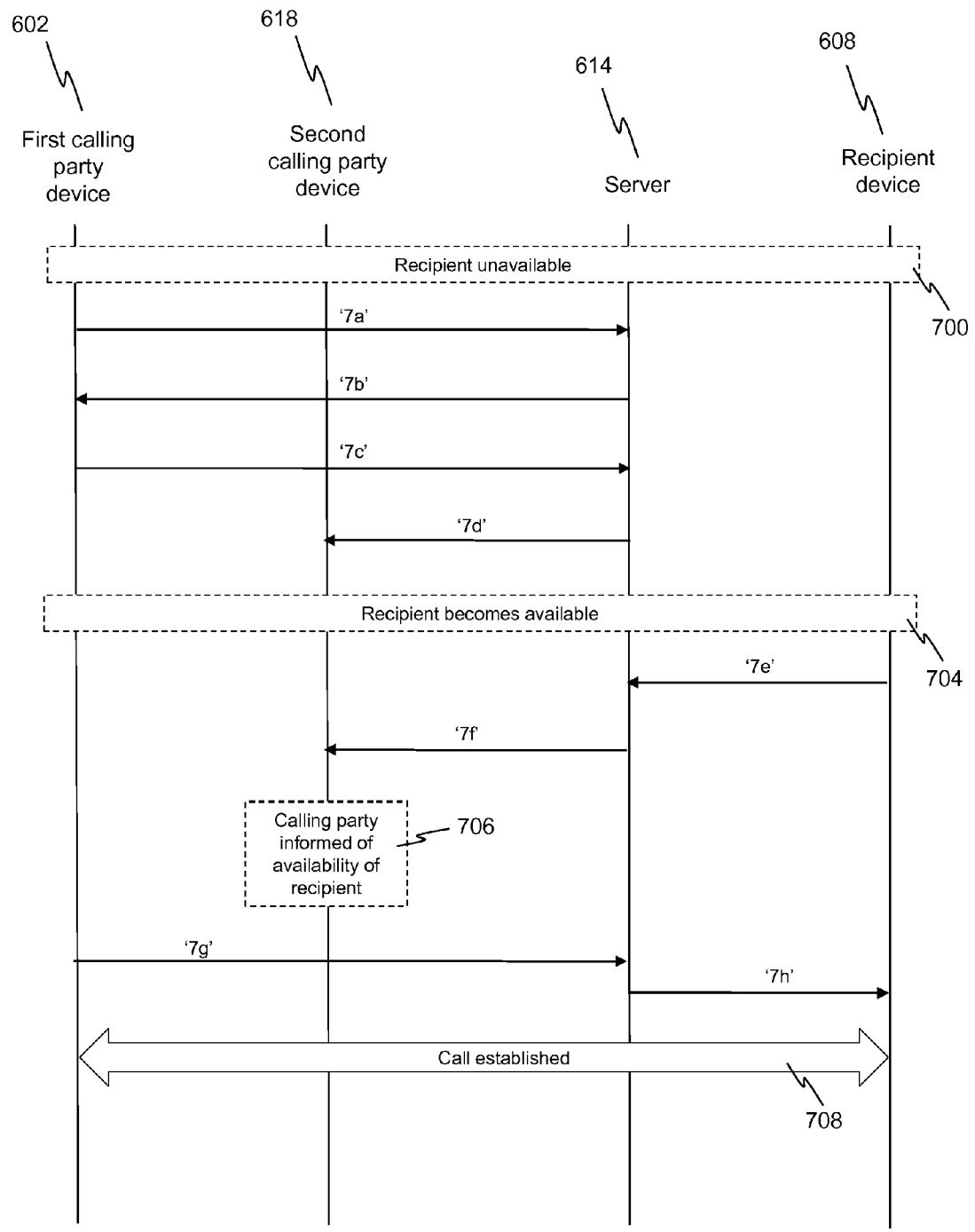
FIG. 7 is a message flow diagram according to embodiments.

FIG. 7 is a message flow diagram showing operation of availability alerting services according to embodiments, for example implemented in a system depicted in FIG. 6.

At the start of the message flow, the recipient is unavailable to accept an incoming call from first calling party device 602, as shown by item 700. The calling party initiates a first call to recipient device 308 from first calling party device 602 which results in a first call set-up procedure. The first call set-up procedure causes the call to be forwarded to server 614 such that an incoming call request from the calling party is received at server 614 in step 7*a*.

Server 614 determines the availability status of the recipient from data store 616. If server 314 determines that the recipient is available to take the call from the calling party, then the call is forwarded on to recipient device 608 and no availability alerting service is initiated.

If server 614 determines that the recipient is unavailable to take the call from the calling party, then server 614 responds to the first incoming call request by establishing a call with first calling party device 602, and transmitting a voice message to the calling party in step 7*b* to indicate a current unavailability status of the recipient. Transmittal of the voice message may involve use of an Interactive Voice Response (IVR) system located within server 614 or accessible by server 614 within network 600 (not shown).

The calling party can choose to initiate an availability alerting service by responding to the voice message with a suitable voice or keypad input via first calling party device 602. The input from first calling party device 602 causes an indicator associated with the second calling party device, for example an IP address, to be transmitted to server 614 during the call in step 7*c* that indicates that the calling party requests initiation of the availability alerting service; an availability alerting service is initiated by server 614 upon receipt of the indicator.

Server 614 informs the calling party that an availability alerting service has been initiated by transmitting a service initiation notification to second calling party device 618 in step 7*d*. Server 614 is able to locate second calling party device 618 within telecommunications network 600 due to the indicator associated with the second calling party device received in step 7*c*.

In alternative embodiments, the calling party may preregister for availability alerting services with the recipient by registering an indicator for second calling party device 618 with server 614 which stores this in data store 616 in association with an identifier for first calling party device 602. When server 614 subsequently receives the incoming call request of step 7*a* from the first calling party device, server 614 can perform a lookup in data store 616 to retrieve information on how to contact second calling party device 618 without the calling party having to re-enter such information in step 7*c*.

When the recipient becomes available to conduct a call with the calling party, as shown by item 704, server 614 is informed of such by transmittal of data associated with the updated availability status of the recipient to server 614 in step 7*e*. Server 614 then transmits an availability update message to second calling party device 618 in step 7*f* in order to solicit a follow-up incoming call request from the calling party.

When the availability update message of step 7*f* is received at second calling party device 618, the calling party is alerted to the fact that the recipient is available to accept an incoming call, as shown by item 706. This may for example involve the recipient seeing an icon displayed on the screen of their personal computer. As a result, the calling party can initiate a second call to recipient device 608 using first calling party device 602 at a subsequent time that is convenient for both the calling party and the recipient, which results in a second call set-up procedure being conducted between first calling party device 602 and recipient device 608.

A follow-up incoming call request from the calling party is received at server 614 in step 7*g*. Server 614 forwards the follow-up incoming call request to recipient device 608 in step 7*h*. The recipient accepts the follow-up incoming call request of step 7*h* and a call is established between first calling party device 602 and recipient device 608, as shown by item 708.

In addition, an availability update message may be transmitted in response to one or more further changes in the availability status of the recipient, for example the recipient availability status changes from available to unavailable available. The calling party is thus discouraged to attempt to initiate a follow-up call to the recipient at a time that is inconvenient for the recipient, or if the recipient device is engaged in a call. When the recipient availability status changes again from unavailable to available, a further availability update message may be transmitted to provide a suitable indication on the calling party device to encourage the follow-up call.

The availability alerting service thus detects a first availability status change relating to the called party after initiation of the availability alerting service and transmits a first availability update message to the calling party to solicit the follow-up call on the basis of the detected first availability status change, and detects a second availability status change, subsequent to the first availability status change, and transmits a second availability update message to the calling party to at least inhibit the follow-up call on the basis of the detected second availability status change.

Once a call between the calling party and recipient has successfully been established, the availability alerting service is deactivated. The deactivation may include removing any data associated with first calling party device 602 and second calling party device 618 from memory store 616 of server 614.

Figure 8:
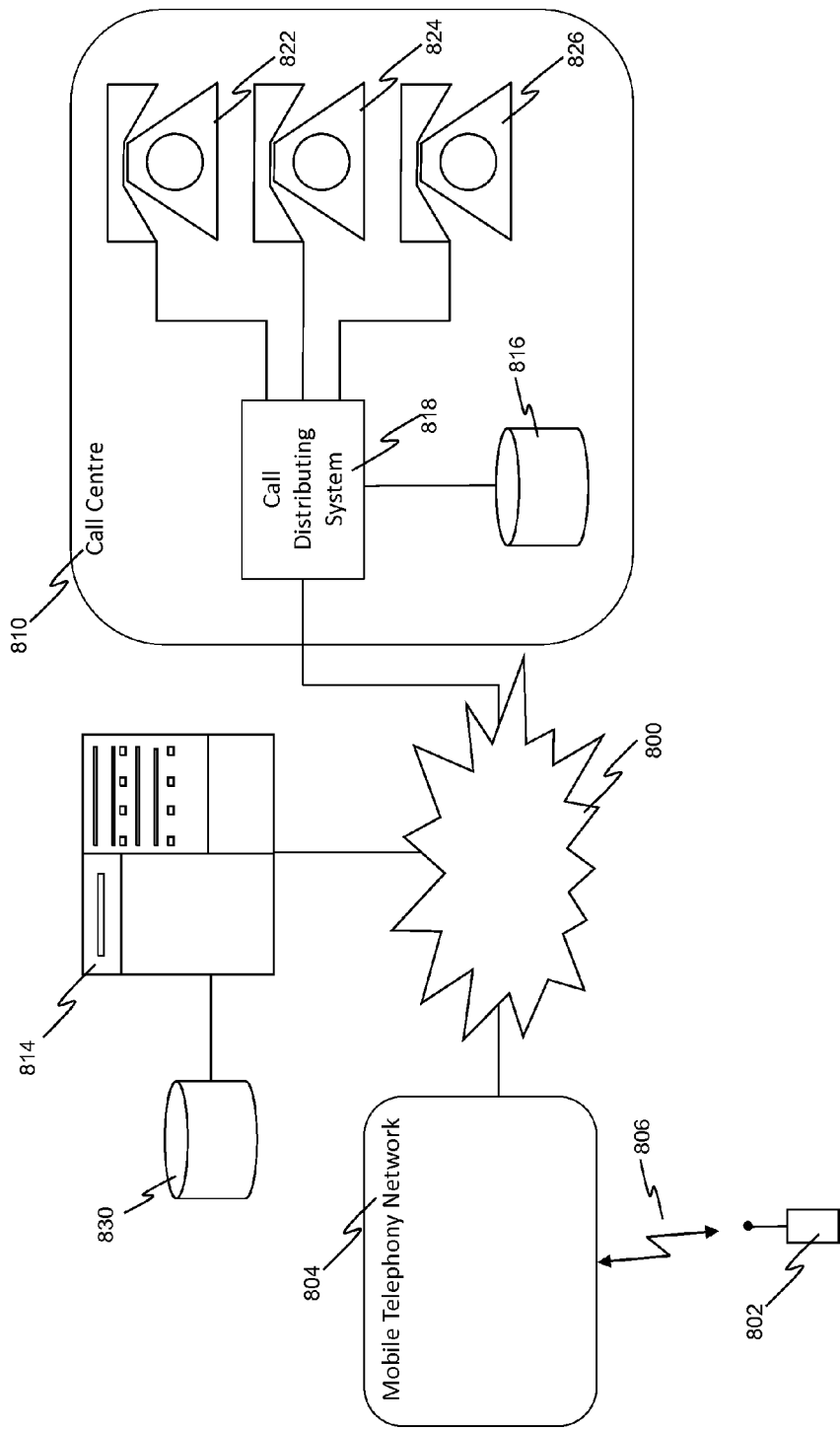
FIG. 8 is a system diagram according to embodiments.

FIG. 8 is a system diagram according to embodiments where the recipient device corresponds to a call centre call distributing system and the recipient or set of recipients correspond to one or more operators in the call centre. Telecommunications network 800, calling party device 802, mobile telephony network 804, and radio interface 806 perform similar functions to the corresponding entities described above with reference to FIG. 1.

Call centre 810 includes a call centre call distributing system 818, responsible for distributing telephone calls incoming to the call centre amongst one or more call centre operators, with the calls being distributed according to the availability of the one or more call centre operators at one or more operator telephony devices 822, 824, 826 (such as analogue or VoIP telephones); in practice there may be more than three such telephony devices located at, or remotely connected to, call centre 810. Call centre call distributing system 818 may include one or more of: a queuing component to manage a queue of incoming calls awaiting handling by call centre operators; a media server for playing announcements or call waiting music to calling parties; an IVR module for providing an initial set of options for more appropriately directing a call within or outside of the call centre, offering distribution of recipient availability data and providing basic service information to calling parties; a universal routing server for routing incoming calls to available operators; and a data store for storing data associated with which operators are registered with the call centre and which operators are available to distribute incoming telephone calls to.

Server 814 is responsible for providing availability alerting services and priority handling services for incoming calls to the call centre. Server 814 connects to call centre call distributing system 818 via telecommunications network 800. Telecommunications network 800 is configured to route all incoming calls directed to call centre 810 to server 814.

Server 814 is adapted to communicate with call centre call distributing system 818 to obtain information regarding the availability of call centre operators at call centre 810. The information includes availability status changes which include a status change to a relatively low call load status at the call queuing system and availability status changes which include a status change to a relatively high call load status at the call queuing system.

In the embodiments described below, call centre call distributing system 818 informs server 814 whenever the call centre changes from an unavailable state to an available state or vice versa. An unavailable state indicates that the call centre is busy, i.e. is experiencing a relatively high number of calls. An unavailable state could mean that the call centre is busy, that there are no operators currently available to take an incoming call, that there are more than a predetermined number of callers in the call-waiting queue or that some other threshold has been breached. An available state indicates that the call centre is not busy, that there are operators available, that less than a predetermined number of callers are in the call-waiting queue or that some other threshold has currently not been breached.

In alternative embodiments, server 814 could contact call centre call distributing system 818 whenever it receives an incoming call in order to ascertain the availability state of the call centre, or call centre call distributing system 818 could periodically transmit call centre availability data to server 814, or server 814 may periodically poll the call centre call distributing system 818 for availability status information.

The interfaces between call centre 810, telecommunications network 800, and mobile telephony network 804 may include one or more gateway or session border controller entities (not shown) which carry out conversion between the various protocols and data formats used to transfer media data and signalling data in the different networks.

In alternative embodiments, server 814 could be located within call centre 810 and/or be an integral part of call centre call distributing system 818.

Figure 9:
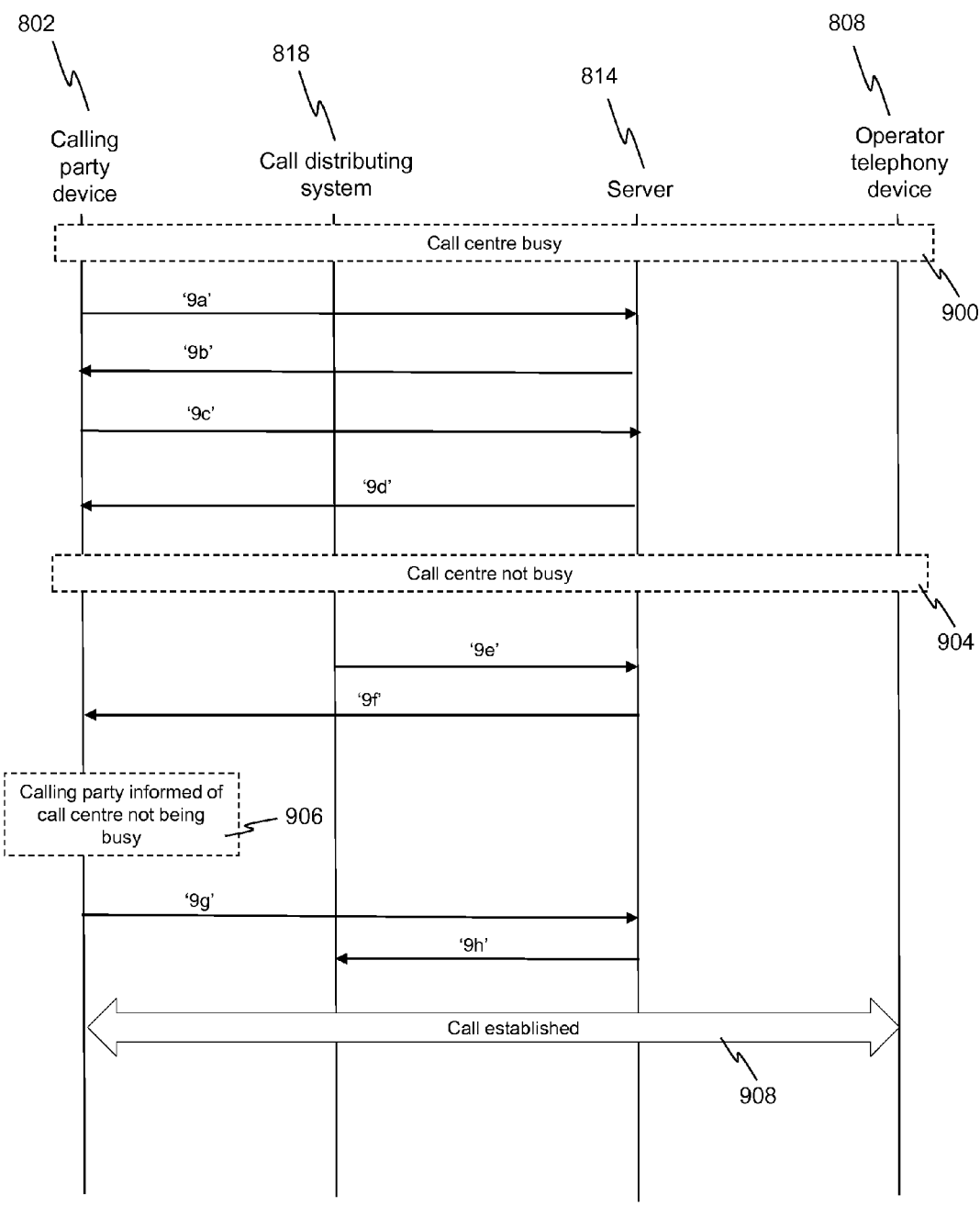
FIG. 9 is a message flow diagram according to embodiments.

FIG. 9 is a message flow diagram showing operation of availability alerting services according to embodiments, for example implemented in a system depicted in FIG. 8.

At the start of the message flow, the call centre is busy and no call centre operators are available to accept an incoming call from calling party device 802, as shown by item 900. The calling party initiates a first call to call centre call distributing system 818 from calling device 802 which results in a first call set-up procedure. The first call set-up procedure causes the first call to be forwarded to server 814 such that an incoming call request from the calling party is received at server 814 in step 9*a*.

Server 814 determines that the last availability status update from call centre call distributing system 818 indicated that the call centre is busy. Server 814 therefore responds to the first incoming call request by establishing a call, and transmitting a voice message to the calling party in step 9*b* to indicate a current unavailability status of the call centre. Transmittal of the voice message may involve use of an Interactive Voice Response (IVR) system (not shown) located within server 814 or call centre 810, or accessible by server 814 within network 800. The voice message may for example state "The call centre is currently busy. If you would like to initiate an availability alerting service for the call centre, please press one on your keypad now."

The calling party can choose to initiate an availability alerting service by responding to the voice message with a suitable voice or keypad input via calling party device 802. The input from the calling party causes an indicator to be transmitted to server 814 during the call in step 9*c* that indicates that the calling party requests initiation of the availability alerting service; an availability alerting service is initiated by server 814 upon receipt of the indicator.

Server 814 informs the calling party that an availability alerting service has been initiated by transmitting a service initiation notification to the calling party in step 9*d*. Initiation of the availability alerting service may include detection of an identifier of a calling device associated with the calling party and inclusion of the identifier in the service initiation notification.

Call centre call distributing system 818 is no longer busy so changes from an unavailable state to an available state, as shown by item 904. Call centre call distributing system 818 informs server 814 accordingly in step 9*e*. Server 814 then transmits an availability update message to calling party device 802 in step 9*f* in order to solicit a follow-up incoming call request from the calling party.

When the availability update message of step 9*f* is received at calling party device 802, the calling party is alerted to the fact that the call centre is no longer busy, as shown by item 906. As a result, the calling party can initiate a second call to call centre call distributing system 818 at a subsequent time that is convenient for both the calling party and the call centre, which results in a second call set-up procedure being conducted between calling party device 802 and call centre call distributing system 818. A follow-up incoming call request from the calling party is received at server 814 in step 9g. Server 814 forwards the follow-up incoming call request to call centre call distributing system 818 in step 9h. Call centre call distributing system 818 accepts the follow-up incoming call request of step 9h by distributing the call to an available call centre operator at one of devices 822, 824 or 826 and a call is established between calling party device 802 and the appropriate one of devices 822, 824, 826 as shown by item 908.

In addition, an availability update message may be transmitted in response to one or more further changes in the availability status of the call centre, for example a further status change to a relatively high call load status at the call queuing system and a yet further availability status change to a relatively high call load status at the call queuing system.

The calling party is thus discouraged to attempt to initiate a follow-up call to the call centre at a time of high call load for the call centre. When the call centre availability status changes again, a further availability update message may be transmitted to provide a suitable indication on the calling party device to encourage the follow-up call.

The availability alerting service thus detects a first availability status change relating to the called party, which in this case is the call centre, after initiation of the availability alerting service and transmits a first availability update message to the calling party to solicit the follow-up call on the basis of the detected first availability status change, and detects a second availability status change, subsequent to the first availability status change, and transmits a second availability update message to the calling party to at least inhibit the follow-up call on the basis of the detected second availability status change.

Once a call between the calling party and an available call centre operator has successfully been established, the availability alerting service is deactivated.

At a call centre, it is not unusual for all of the call centre operators to be engaged in calls at any one time. Thus, measuring the availability of operators at a call centre based on whether there are any free operators available to immediately accept an incoming call may not work particularly well with a busy call centre. Instead, an approximation of how long a calling party may have to wait to speak to an operator could be a more useful measure of call centre operator availability. In this way, calling parties can be encouraged to call when the amount of time they would be required to wait to speak to an operator is relatively low, and discouraged from calling when the amount of time that they would be required to wait is relatively high.

Due to the variation in call durations at a call centre, the rate at which calls are handled by operators is variable. It can therefore be difficult to accurately measure the amount of time a calling party would be required to wait to speak to a call centre operator. Instead, a measure of operator availability at a call centre may be arrived at using one or more of the following characteristics: the number of incoming calls currently being experienced by the call centre call distributing system, the number of calls currently being held in a queue for distribution to available operators, the current rate of calls incoming to the call centre call distributing system, the average length of each call being handled by operators at the call centre, etc.

The number of active operators working at a call centre is also variable. For example, fewer operators may be employed to work during the night or at weekends. The number of active operators at a call centre directly influences the call handling capacity of the call centre, which in turn influences the amount of time a calling party could be required to wait to speak to a call centre operator. The characteristics listed above could therefore be adjusted according to the call handling capacity of the call centre in order to provide a value more representative of the amount of time a calling party could be required to wait to speak to a call centre operator.

Based on the characteristic(s) chosen to measure availability of the call centre operators, call centre call distributing system 818 (or server 814) can determine whether the availability of call centre operators is in a first or a second state, where the first state represents a relatively low availability (i.e. the call centre is relatively busy), and the second state represents a relatively high availability (i.e. the call centre is relatively un-busy).

Call centre call distributing system 818 (or server 814) may utilise threshold values in order to determine the availability state of the call centre operators. In some embodiments, a single threshold value could be employed, where if the availability does not exceed the threshold value, the availability is considered to be in the first state, and if the availability exceeds the threshold value, the availability is considered to be in the second state.

In other embodiments, two threshold values could be employed, where the two threshold values are set slightly apart to introduce hysteresis into the transitioning of the availability from one state to the other. In these embodiments, the availability is considered to be in the first state until the availability exceeds a first threshold value, after which the availability is considered to be in a second state until the availability falls below a second threshold value. Such threshold values can be stored in data store 816 of call centre 810 or in a data store 830 associated with server 814.

In order to more accurately reflect the amount of time a calling party could be required to wait to speak to a call centre operator, the threshold values may be dynamically varied as the call handling capacity of the call centre varies.

Implementing embodiments in combination with a call centre call distributing system also provides additional options for handling incoming call attempts on a priority basis. For example, handling a call set-up request on a priority basis may include moving the call set-up request forward in the queue at the call centre call distributing system, perhaps even to the front of the queue.

Embodiments relating to the provision of priority handling services to a calling party attempting to contact a call centre operator may also be implemented in the system depicted in FIG. 8 via a similar message flow to that depicted in FIG. 9.

Server 814 is adapted to receive and process incoming call requests relating to priority handling and provide priority handling services. Data store 816 of call centre 810 is adapted to storing data relating to the operation of the priority handling services, or alternatively data store 830 associated with server 814 could be used to store such data.

When the calling party initiates a first call to call centre call distributing system 818, a first call set-up procedure is conducted resulting in an incoming call request from the calling party being received at server 814 in step 9a. Server 814 determines that the last availability status update from call centre call distributing system 818 indicated that the call centre is busy. In response to detection of the unavailability state, an option for the calling party to attempt a follow-up call instead of progressing the detected unavailable state is determined.

An IVR system could be employed to give the calling party the option of progressing the detected unavailability state, for example using the following message "The call centre is currently busy. Please press 1 on your keypad to join the queue of calls waiting to be distributed to available call centre operators". If the calling party chooses option 1, the call is forwarded to call centre call distributing system 818.

An IVR system could be employed to give the calling party the option of attempting a follow-up call, for example using the following message "Alternatively, please press 2 on your keypad to initiate a priority handling service for a follow-up call". If the calling party chooses option 2, a priority handling service is initiated for the calling party.

Assuming the calling party chooses option 2, the calling party may after a predetermined delay time and/or after a dynamic delay time associated with the availability state of the recipient (or set of recipients), have a priority handling service activated, when they next call. When the calling party initiates a second call to call centre call distributing system 818, providing this is done once the priority handling service is activated (which may be done in response to the predetermined or dynamic delay time passing), the priority handling service may be activated for a second call set-up procedure in a follow-up incoming call request received from the calling party. As a result of a priority handling service being active for the calling party, the second call set-up procedure is handled using the priority handling service.

Initiation of the priority handling service may involve detecting an identifier of a device, such as calling party device 802, associated with the calling party in the first call set-up procedure and storing the detected calling party device identifier, for example in call centre data store 816 or data store 830 associated with server 814. A calling party device identifier received during the second call set-up procedure can then be matched with the stored calling party device identifier allowing correct identification of the second call from the calling party to apply a priority handling service to.

In embodiments involving call centre 810, availability alerting services can be combined with priority handling services for the call centre so that when priority handling services are initiated, availability alerting services are also initiated and provision of priority handling services involves transmitting an availability update message to solicit a follow-up incoming call request from the calling party.

Figure 10:
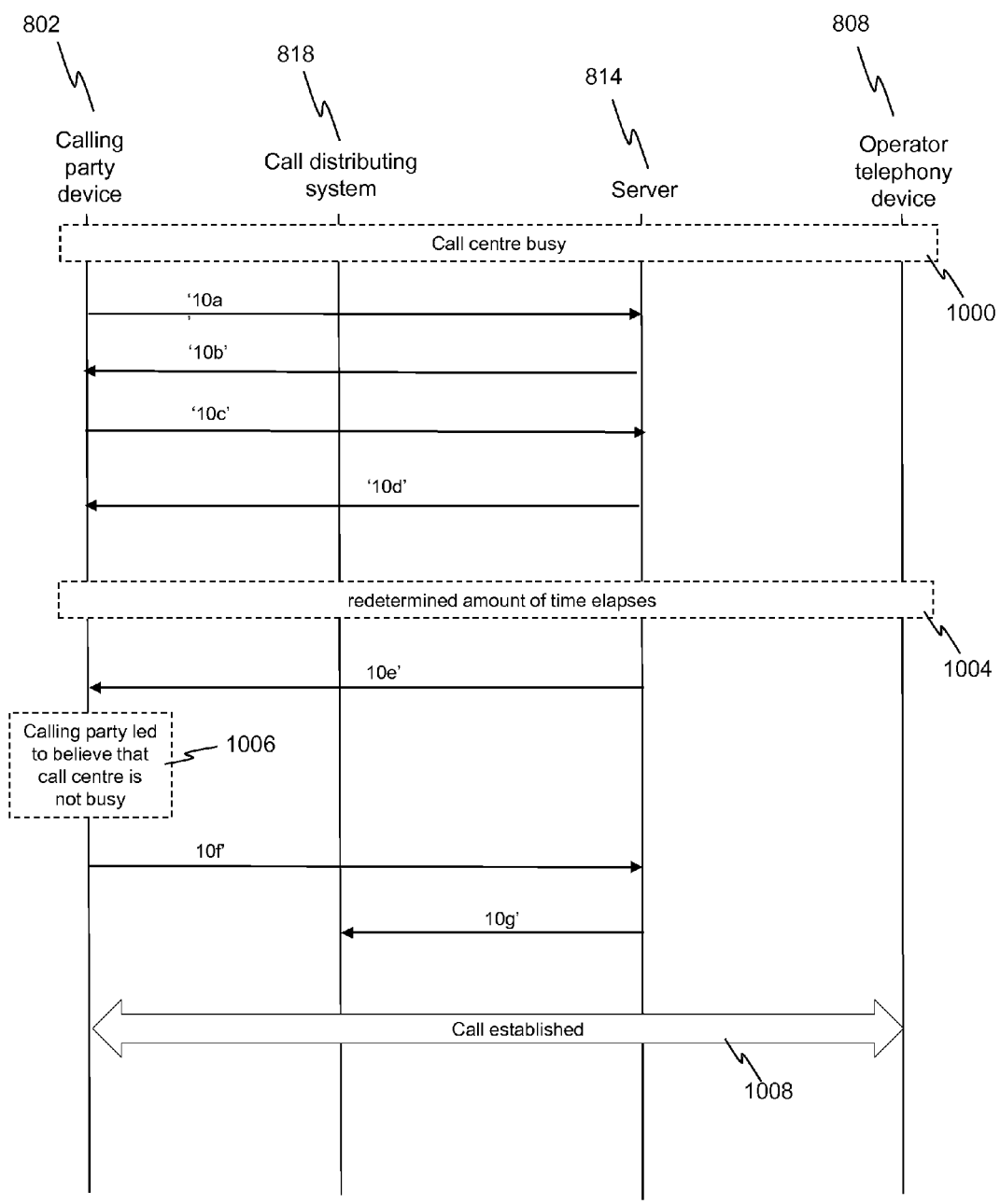
FIG. 10 is a message flow diagram according to embodiments.

FIG. 10 is a message flow diagram according to embodiments, for example implemented in a system depicted in FIG. 8. In these embodiments, a combination of priority handling and availability alerting services are provided to a calling party attempting to contact an available call centre operator if at least a predetermined length of time has passed since the calling party initially contacted the call centre.

At the start of the message flow, the call centre is busy and no call centre operators are available to accept an incoming call from calling party device 802, as shown by item 1000. The calling party initiates a first call to call centre call distributing system 818 from calling device 802 which results in a first call set-up procedure. The first call set-up procedure causes the first call to be forwarded to server 814 such that an incoming call request from the calling party is received at server 814 in step 10*a*.

Server 814 determines that the last availability status update from call centre call distributing system 818 indicated that the call centre is busy. Server 814 therefore responds to the first incoming call request by establishing a call, and transmitting a voice message to the calling party in step 10*b* to indicate a current unavailability status of the call centre. Transmittal of the voice message may involve use of an Interactive Voice Response (IVR) system (not shown) located within server 814 or call centre 810, or accessible by server 814 within network 800. The voice message may for example state "The call centre is currently busy. If you would like to initiate an availability alerting service for the call centre, please press one on your keypad now."

The calling party can choose to initiate an availability alerting service by responding to the voice message with a suitable voice or keypad input via calling party device 802. The input from the calling party causes an indicator to be transmitted to server 814 during the call in step 9*c* that indicates that the calling party requests initiation of the availability alerting service; an availability alerting service is initiated by server 814 upon receipt of the indicator.

Server 814 informs the calling party that an availability alerting service has been initiated by transmitting a service initiation notification to the calling party in step 10*d*. Server 814 records the time of the initiation of the availability alerting service for the calling party and stores this in association with an identifier of a device associated with the calling party in the first call set-up procedure in data store 830.

Call centre 810 remains busy so stays in an unavailable state. If call centre 810 remains busy for a predetermined length of time since initiation of the availability alerting service for the calling party, as shown by item 1004, server 814 determines that a priority handling service should be initiated for the calling party in combination with the availability alerting service.

Providing the priority handling service involves transmitting an availability update message to calling party device 802 in step 10*e* to solicit a follow-up incoming call request from the calling party even though the call centre remains busy. The priority handling service therefore overrides the current unavailability status because the calling party has received a relatively poor quality of service, i.e. has waited too long before being able to speak to an available call centre operator.

Upon receipt of the availability update message of step 10*e*, the calling party is led to believe that the availability of the call centre has changed from an unavailable state to an available state, as shown by item 1006, and is thus encouraged to initiate a second call to call centre 810. As a result, the calling party can initiate a second call to call centre call distributing system 818 at a subsequent time that is convenient for both the calling party and the call centre, which results in a second call set-up procedure being conducted between calling party device 802 and call centre call distributing system 818. A follow-up incoming call request from the calling party is received at server 814 in step 10*f*. Server 814 forwards the follow-up incoming call request to call centre call distributing system 818 in step 10*g* with instructions that the incoming call is to be handled on a priority basis.

When call centre call distributing system 818 receives the follow-up incoming call request of step 10*g*, it handles the call on a priority basis as instructed by server 814. The priority basis handling may involve moving the call forward in the queue of other incoming calls awaiting distribution to available call centre operators, or may involve moving the call to the front of the queue, in which case the call is distributed to the first call centre operator which becomes available at one of devices 822, 824 or 826. A call is then established between calling party device 802 and the appropriate one of devices 822, 824, 826 as shown by item 1008.

Once a call between the calling party and an available call centre operator has successfully been established, the availability alerting service is deactivated.

In alternative embodiments, features from the embodiments depicted in FIG. 9 and FIG. 10 are combined. After step 9*f* in FIG. 9, the calling party is informed that the call centre is not busy. However, the calling party may not be able to make a follow-up call before the call centre becomes busy again. Under normal operation, a further availability update message would be transmitted to inform the calling party that the call centre is now busy again. However, if a predetermined amount of time has elapsed since initiation of the availability alerting service for the calling party, the calling party can be provided with a priority handling service which overrides normal operation and transmittal of the further availability update message is prevented. The calling party is therefore led to believe that the call centre is still not busy (as in item 1006 of FIG. 10). A subsequent call set-up procedure from the calling party is then handled on a priority basis, even though the call centre is actually busy when the second call is made.

Availability alerting and priority handling services may be provided to multiple calling parties in relation to a recipient. A recipient may prefer to accept a call from a certain calling party or group of calling parties in preference to one or more other calling parties. A subset of preferred calling parties can be selectively informed of a different availability status for the recipient, possibly at differing times, rather than informing all of the calling parties of the same availability at the same time. In this way, the preferred subset of calling parties are encouraged to initiate calls to the recipient in preference to other calling parties, i.e. come calling parties are given priority over other calling parties.

A subset of preferred calling parties and associated availability statuses may be selected and maintained via user input to application software, or an in-built function, on the recipient device or via the server controlling the availability alerting and priority handling services. Data associated with preferred calling parties can be stored in memory on the recipient device or server.

If multiple calling parties are registered to receive availability updates, and all such parties are informed of an updated availability of the recipient at the same time, a large volume of attempts to initiate calls with the recipient may occur at the same time. Availability updates can therefore be staggered in time for different calling parties, possibly ordered according to preference by the recipient.

Once the recipient accepts an incoming call, the availability of the recipient will quickly change back to unavailable, resulting in further unsuccessful call attempts to the recipient. Staggering the distribution of recipient availability updates amongst different calling parties therefore also helps to mitigate this problem by reducing the number of calling parties that are alerted to an availability status of the recipient contemporaneously.

Handling an incoming call from a calling party on a priority basis may include routing the incoming call directly to the recipient, bypassing any switchboard or other intermediary steps sometimes encountered when establishing a call between a calling party and a recipient.

In the embodiments described above, an availability update message is transmitted to a device associated with the calling party to inform the calling party of the availability status of the recipient that the calling party is trying to contact. In response to receipt of an availability update message, the calling party device may make an appropriate output to inform the calling party of the updated availability status of the recipient.

The output may include a visual availability indicator such as an image or icon that is displayed on the screen of the device. Further, the indicator may include a notification light that is illuminated on the device. Yet further, the indicator may include an audio availability indicator such that audio data is output by an audio transducer on the device such as a loudspeaker. Alternatively, the indicator may include a tactile availability indicator by activating a mechanical oscillator in the device to cause the device to vibrate, perhaps in a distinctive sequence or rhythm. The indicator could be an audio-visual indicator, i.e. combining both audio and visual elements, possibly even combining a tactile element also.

The indicator provides an audio, visual and/or tactile cue for encouraging or discouraging the calling party from attempting to initiate a follow-up call to the recipient. Hence, the calling party is aided in deciding upon an appropriate time to contact the recipient that is convenient for both parties.

In order to facilitate the outputting of the indicator on the device, software application providing an availability alerting service can be installed on the device to interpret the availability update message and execute the outputting of the indicator accordingly. In one embodiment, application software may be installed on the device prior to receiving an availability update message from the server, for example transmitted to the device in conjunction with (or encapsulated within) the service initiation notification. In another embodiment, the availability update message itself may include the data required to install the application software on the device.

In other embodiments, an availability alerting function or software application may not be required to output the indicator on the device, and an availability update message received by the device may contain all of the necessary data for allowing the indicator to be output, such as an image in the case of a visual indicator (for example in Joint Photographic Experts Group (JPEG) file format), or audio data in the case of an audio indicator (for example in the Waveform Audio (WAV) file format).

When a first availability update message is received, the calling party device may output a first indicator. If one or more subsequent availability update messages are received (because the availability status of the recipient has changed) then a different indicator may be output, or the first indicator may be updated. Updating the indicator on the calling party device may involve changing the colour, shape, size or image of a visual indicator displayed on the screen of the device, enabling disabling or changing the colour of a notification light on the device, or outputting audio of a different pitch, volume, sequence or from a different audio data file. One example implementation may involve outputting a green icon when the recipient is available and a red icon when the recipient is not available.

In order to simplify the process of initiating a follow-up call attempt with the recipient, the outputted availability indicator may be interactive, and be responsive to calling party input.

In the case of a visual availability indicator, which may for example in the form of an icon displayed on the screen of the calling party device, the calling party may interact with the icon by pressing a button adjacent to or otherwise associated with the icon (i.e. softkey functionality), by moving a cursor over the icon and by selecting it by further input (such as by operating a button associated with the cursor), or by pressing the icon with a finger or stylus in the case that the calling party device has a touch sensitive screen.

In the case of an audio availability indicator, the indicator may be interacted with in the form of a voice command from the calling party received via a microphone or other audio input transducer on the calling party device.

In response to receiving calling party input via the outputted indicator, the software or function on the calling party device, which provides the recipient availability indicator, may be configured to initiate a subsequent call with the recipient in response to input via, or in response to, the indicator. In this way, the calling party is prevented from having to re-enter the telephone dialling number of the recipient when attempting to initiate a subsequent call to the recipient.

Actions carried out in response to calling party input via, or in response to, the outputted indicator may be conditional on further parameters, such as the current (or most recent) form of the outputted indicator. According to some embodiments, calling party input received via the availability indicator may only initiate a subsequent call to the recipient if the indicator is informing (or has most recently informed) the calling party that the recipient is available. In this way, the calling party can be discouraged from initiating a subsequent call to the recipient when the recipient is unavailable.

According to embodiments, attempts to initiate calls with the recipient may be handled on a priority basis only if initiated whilst the current (or most recent) form of the outputted indicator informs the calling party that the recipient is available.

According to some embodiments, a calling party device may not have sufficient data processing or indicator outputting capabilities to handle availability update messages, in which case availability update messages can be transmitted to a second, different calling party device, such as a personal computer, that does have the required capabilities.

Embodiments involving use of two calling party devices may employ Computer Telephony Integration (CTI) functionality. Utilising standard CTI protocols, such as autodialing, the second calling party device may be configured to initiate a follow-up call attempt to the recipient from the first calling party device, in response to receiving calling party input via an outputted availability indicator on the second calling party device.

The above embodiments are to be understood as illustrative examples. Further embodiments are envisaged.

In embodiments, the availability alerting service detects a third availability status change relating to the call handling system, subsequent to the second availability status change, and transmits a third availability update message to the calling party to solicit the follow-up call on the basis of the detected third availability status change.

Embodiments comprise receiving an incoming call request for the initial call from the calling party, and initiating the availability alerting service at least partly in response to receiving the incoming call request.

A service initiation notification may be transmitted by means of a push notification to software application, or in-built function, on the calling party device.

Embodiments comprise detecting completion of the follow-up call, and deactivating the availability alerting service in response to the detected completion.

Embodiments comprise the detected completion comprising the follow-up call being allocated to an operator.

Embodiments comprise the first availability status change comprising a status change to a relatively low call load status at the call queuing system and the second availability status change comprises a status change to a relatively high call load status at the call queuing system.

Embodiments comprise transmitting an application software component to a device associated with the calling party during the initiation of the availability alerting, the application software component being able to process the availability update messages.

Embodiments comprise the availability alerting service being initiated by detecting an identifier of a device associated with the calling party, and transmitting a service initiation notification to the calling party, on the basis of the identifier of the device associated with the calling party.

Embodiments comprise the service initiation notification is transmitted by means of a push notification to an application on the calling party device.

Embodiments comprise the availability alert message being transmitted in response to an update request from an application on a device associated with the calling party.

In embodiments, there is provided a method of indicating called party availability in a telecommunications network, the method comprising:
  receiving a first availability update message to solicit a follow-up call from a calling party after a non-completed initial call from the calling party, the first availability update message indicating a first availability status change relating to the called party after initiation of an availability alerting service;
  providing a first indicator indicative of the first availability status change;
  receiving, subsequent to the first availability update message, a second availability update message to at least inhibit the follow-up call, the second availability update message indicating a second availability status change relating to the called party after the first availability status change; and
  providing a second indicator indicative of the second availability status change.

In embodiments, there is provided apparatus for indicating called party availability in a telecommunications network, the apparatus comprising:
  a data receiver for receiving availability update messages;
  a data processor for generating display control data; and
  a display for displaying indicators on the basis of the display control data,
  the data receiver being configured to receive a first availability update message to solicit a follow-up call from a calling party after a non-completed initial call from the calling party, the first availability update message indicating a first availability status change relating to the called party after initiation of an availability alerting service,
  the data processor being configured to generate first display control data on the basis of the first availability status change indicated in the first availability update message, the first display control data controlling the display to provide a first indicator indicative of the first availability status change,
  the data receiver being configured to receive, subsequent to the first availability update message, a second availability update message to at least inhibit the follow-up call, the second availability update message indicating a second availability status change relating to the called party after the first availability status change, and
  the data processor being configured to generate second display control data on the basis of the second availability status change indicated in the second availability update message, the second display control data controlling the display to provide a second indicator indicative of the second availability status change.

In embodiments, the data processor is capable of initiating the follow-up telephone call in response to user input, the data processor being configured to, upon receipt of user input associated with selection of the first indicator, initiate the follow up call to the called party.

In embodiments, the data processor is configured to, upon receipt of user input associated with selection of the second indicator, inhibit the initiation of the follow up call to the called party.

In embodiments, there is provided a computer program product comprising a non-transitory computer-readable storage medium having computer readable instructions stored thereon, the computer readable instructions being executable by a computerized device to cause the computerized device to perform a method for indicating called party availability in a telecommunications network, the method comprising: the method comprising:

receiving a first availability update message to solicit a follow-up call from a calling party after a non-completed initial call from the calling party, the first availability update message indicating a first availability status change relating to the called party after initiation of an availability alerting service;

providing a first indicator indicative of the first availability status change;

receiving, subsequent to the first availability update message, a second availability update message to at least inhibit the follow-up call, the second availability update message indicating a second availability status change relating to the called party after the first availability status change; and providing a second indicator indicative of the second availability status change.

In embodiments, there is provided, a method of indicating availability in a telecommunications network, the method comprising:

initiating an availability alerting service in response to a trigger associated with non-completion of an initial call from a calling party to a called party, the availability alerting service providing the calling party with availability alert information to solicit a follow-up call from the calling party when the called party has a given availability state after the initial call; and detecting completion of the follow-up call, and deactivating the availability alerting service in response to the detected completion.

In embodiments, there is provided apparatus for indicating availability in a telecommunications network, the apparatus comprising:

a service initiator component configured to initiate an availability alerting service in response to a trigger associated with non-completion of an initial call from a calling party to a called party, the availability alerting service providing the calling party with availability alert information to solicit a follow-up call from the calling party when the called party has a given availability state after the initial call; and a service deactivator component configured to detect completion of the follow-up call, and to deactivate the availability alerting service in response to the detected completion.

In embodiments, there is provided a method of handling an incoming call in a telecommunications network, the method comprising:

in a first call set-up procedure, receiving an initial incoming call request from a calling party;

initiating an availability alerting service and a priority handling service in response to the first call set-up procedure;

after initiating the availability alerting service, transmitting an availability alert message to solicit a follow-up incoming call request from the calling party;

in a second call set-up procedure, receiving the follow-up incoming call request from the calling party; and handling the second call set-up procedure using the priority handling service.

Whilst the above embodiments have been described in relation to mobile telephony devices and mobile telephony networks, the disclosure could equally be applied to any combination of wireline telephony devices having access to wireline telephony networks or Voice over Internet Protocol (VoIP) telephony devices having access to the Internet. Any of the embodiments described above including availability alerting service functionality could be combined with any of the embodiments described above including priority handling service functionality.

The above description of embodiments primarily refers to telephone calls; such telephone calls could include voice calls or video calls.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of indicating availability in a telecommunications network, the method comprising:

initiating a call center operator availability alerting service in response to a trigger associated with non-completion of an initial call from a calling party, the initial call being directed to a call handling system comprising a call queuing system for allocating a call to one of a plurality of call center operators after reaching the front of a call holding queue, the trigger relating to the initial call not being allocated to a call center operator in the plurality of call center operators, the call center operator availability alerting service providing the calling party with availability alert information to solicit a follow-up call from the calling party when the call handling system has a given availability state after the initial call, wherein the availability alerting service is responsive to a plurality of different availability states relating to the call handling system, and wherein the availability alerting service detects a first availability status change comprising a status change to a relatively low call load status at the call queuing system after initiation of the availability alerting service and transmits a first availability update message to the calling party to solicit the follow-up call on the basis of the detected first availability status change, and detects a second availability status change comprising a status change to a relatively high call load status at the call queuing system, subsequent to the first availability status change, and transmits a second availability update message to the calling party to at least inhibit the follow-up call on the basis of the detected second availability status change.

2. The method according to claim 1, wherein the availability alerting service detects a third availability status change subsequent to the second availability status change, the third availability status change relating to the call handling system, and transmits a third availability update message to the calling party to solicit the follow-up call on the basis of the detected third availability status change.

3. The method according to claim 1, further comprising receiving an incoming call request for the initial call from the calling party, and initiating the availability alerting service at least partly in response to receiving the incoming call request.

4. The method according to claim 3, further comprising answering the initial call, detecting an indication from the calling party during the answered call indicating that the calling party wishes to use the availability alerting service, and initiating the availability alerting service at least partly in response to the detected indication.

5. The method according to claim 1, further comprising detecting completion of the follow-up call, and deactivating the availability alerting service in response to the detected completion.

6. The method according to claim 5, wherein the detected completion comprises the follow-up call being allocated to an operator.

7. The method according to claim 1, further comprising transmitting an application software component to a device associated with the calling party during the initiation of the availability alerting, the application software component being able to process the availability update messages.

8. The method according to claim 1, wherein the availability alerting service is initiated by detecting an identifier of a device associated with the calling party, and transmitting a service initiation notification to the calling party, on the basis of the identifier of the device associated with the calling party.

9. The method according to claim 8, wherein the service initiation notification is transmitted by means of a push notification to an application on the calling party device.

10. The method according to claim 1, wherein the availability alert message is transmitted in response to an update request from an application on a device associated with the calling party.

11. An apparatus arranged to indicate availability in a telecommunications network, comprising:
an initiator component configured to initiate a call center operator availability alerting service in response to a trigger associated with non-completion of an initial call from a calling party, the initial call being directed to a call handling system comprising a call queuing system for allocating a call to one of a plurality of call center operators after reaching the front of a call holding queue, the trigger relating to the initial call not being allocated to a call center operator in the plurality of call center operators, the call center operator availability alerting service providing the calling party with availability alert information to solicit a follow-up call from the calling party when the call handling system has a given availability state after the initial call,
wherein the availability alerting service is responsive to a plurality of different availability states relating to the call handling system, and
wherein the availability alerting service detects a first availability status change comprising a status change to a relatively low call load status at the call queuing system after initiation of the availability alerting service and transmits a first availability update message to the calling party to solicit the follow-up call on the basis of the detected first availability status change, and detects a second availability status change comprising a status change to a relatively high call load status at the call queuing system, subsequent to the first availability status change, and transmits a second availability update message to the calling party to at least inhibit the follow-up call on the basis of the detected second availability status change.

12. A computer program product comprising a non-transitory computer-readable storage medium having computer readable instructions stored thereon, the computer readable instructions being executable by a computerized device to cause the computerized device to perform a method for indicating availability in a telecommunications network, the method comprising:
initiating a call center operator availability alerting service in response to a trigger associated with non-completion of an initial call from a calling party, the initial call being directed to a call handling system comprising a call queuing system for allocating a call to one of a plurality of call center operators after reaching the front of a call holding queue, the trigger relating to the initial call not being allocated to a call center operator in the plurality of call center operators, the call center operator availability alerting service providing the calling party with availability alert information to solicit a follow-up call from the calling party when the call handling system has a given availability state after the initial call,
wherein the availability alerting service is responsive to a plurality of different availability states relating to the call handling system, and
wherein the availability alerting service detects a first availability status change comprising a status change to a relatively low call load status at the call queuing system after initiation of the availability alerting service and transmits a first availability update message to the calling party to solicit the follow-up call on the basis of the detected first availability status change comprising a status change to a relatively high call load status at the call queuing system, and detects a second availability status change, subsequent to the first availability status change, and transmits a second availability update message to the calling party to at least inhibit the follow-up call on the basis of the detected second availability status change.

* * * * *